United States Patent
Kyosti et al.

(10) Patent No.: US 10,128,967 B2
(45) Date of Patent: Nov. 13, 2018

(54) OVER-THE-AIR TEST

(71) Applicant: Keysight Technologies, Inc., Minneapolis, MN (US)

(72) Inventors: Pekka Kyosti, Jokirinne (FI); Lassi Hentila, Kempele (FI); Wei Fan, Aalborg Øst (DK)

(73) Assignee: Keysight Singapore (Holdings) Pte. Ltd., Singapore (SG)

( * ) Notice: Subject to any disclaimer, the term of this patent is extended or adjusted under 35 U.S.C. 154(b) by 0 days.

(21) Appl. No.: 15/126,795

(22) PCT Filed: Apr. 16, 2015

(86) PCT No.: PCT/GB2015/051158
§ 371 (c)(1),
(2) Date: Sep. 16, 2016

(87) PCT Pub. No.: WO2015/159092
PCT Pub. Date: Oct. 22, 2015

(65) Prior Publication Data
US 2017/0093509 A1 Mar. 30, 2017

(30) Foreign Application Priority Data

Apr. 16, 2014 (GB) .................................. 1406896.9

(51) Int. Cl.
*H04B 17/00* (2015.01)
*H04B 17/391* (2015.01)
(Continued)

(52) U.S. Cl.
CPC ............ *H04B 17/3911* (2015.01); *H04L 5/14* (2013.01); *H04W 24/06* (2013.01)

(58) Field of Classification Search
None
See application file for complete search history.

(56) References Cited

U.S. PATENT DOCUMENTS

| | | | |
|---|---|---|---|
| 2002/0177448 A1* | 11/2002 | Moran | H04L 41/00 455/456.1 |
| 2011/0299570 A1* | 12/2011 | Reed | H04B 7/0434 375/130 |

(Continued)

OTHER PUBLICATIONS

GB Office Action dated Mar. 23, 2016.
(Continued)

*Primary Examiner* — Chirag Shah
*Assistant Examiner* — Amar Persaud

(57) ABSTRACT

A system for emulating an over-the-air channel for communicating with a device under test is provided. The system comprises an anechoic chamber having $N_A$ primary probes and $N_B$ secondary probes where $N_A > N_B$. The system also comprises a dividing module for dividing $N_A$ primary impulse responses $\{\mu_{n_A}\}$ into $N_B$ subsets; and a defining module for defining $N_B$ secondary impulse responses $\{v_{n_B}\}$ in terms of the primary impulse responses $\{\mu_{n_A}\}$ and a set of $N_B$ complex sequences $\{\lambda_{n_B}\}$. In the system, either the primary probes are downlink probes, the primary impulse responses are downlink impulse responses, the secondary probes are uplink probes and the secondary impulse responses are uplink impulse responses, or the primary probes are uplink probes, the primary impulse responses are uplink impulse responses, the secondary probes are downlink probes and the secondary impulse responses are downlink impulse responses.

18 Claims, 14 Drawing Sheets

(51) Int. Cl.
*H04L 5/14* (2006.01)
*H04W 24/06* (2009.01)

(56) References Cited

U.S. PATENT DOCUMENTS

| | | | |
|---|---|---|---|
| 2012/0098713 A1 | 4/2012 | Mow et al. | |
| 2012/0100813 A1 | 4/2012 | Mow et al. | |
| 2013/0300616 A1* | 11/2013 | Reed | G01R 29/10 343/703 |
| 2013/0303089 A1* | 11/2013 | Wang | H04W 24/06 455/67.12 |
| 2015/0099473 A1* | 4/2015 | Szini | H04W 24/06 455/67.12 |
| 2015/0188647 A1* | 7/2015 | Wang | H04B 17/00 455/67.12 |
| 2016/0226601 A1* | 8/2016 | Hu | H04B 7/06 |

OTHER PUBLICATIONS

Kyösti et al., "OTA Testing for Multi-Antenna Terminals", European Cooperation in the Field of Scientific and Technical Research COST21 00 to (08) 670; COST21 00, FI; Lille, FR, vol. 2008, Oct. 6, 2008 (Oct. 6, 2008), pp. 1-8.
GB Office Action dated May 23, 2016.
Pekka Kyosti, Summary of EB/Anite / Keysight MIMO OTA Contributions to cost 2100, IC1004 and Iracon, Cost 2100, www.anite.com, Aug. 17, 2016.
Written Opinion dated Jun. 29, 2015 for International Application No. PCT/GB2015/051158.
Notification of Grant, Patent Serial No. GB2525387, dated Feb. 14, 2017.
UK Patent Application GB2525387, published Oct. 28, 2015, with UK Search report, dated Sep. 23, 2014, 42 pgs.

* cited by examiner

OVER-THE-AIR TEST

The present application is a U.S. national phase application under 35 U.S.C. § 371(c) of International Patent Application No. PCT/GB2015/051158 filed on 16 Apr. 2015, naming Pekka Kyosti as inventor. Priority is claimed under 35 U.S.C. § 365 from International Patent Application No. PCT/GB2015/051158, and the entire disclosure of International Patent Application No. PCT/GB2015/051158 is specifically incorporated herein by reference in its entirety.

FIELD OF THE INVENTION

This invention relates to over-the-air testing of a device in an anechoic chamber. In particular, the invention is suitable for simulating both uplink and downlink over-the-air communication with a device under test even when the anechoic chamber has different numbers of uplink and downlink probes.

BACKGROUND

When a radio frequency signal is transmitted over the air from a transmitter to a receiver, it propagates along a straight line between the transmitter and receiver, as well as propagating along other paths involving reflection off objects such as buildings and mountains. As the signal travels along the different paths it becomes attenuated and delayed by different amounts, and arrives at the receiver from different angles. The propagation paths, each causing different fading of the signal, make up a radio channel along which the signal is transmitted. In addition, noise and signals from other transmitters interfere with the signal, and the total signal received at the transmitter is a sum of the faded beams of the different paths and the additional interfering signals.

Radio communication between a subscriber terminal, such as a cell phone, and a base station of a radio system can be tested using a radio channel emulator which emulates the propagation of a signal along a radio channel. The radio channel emulator simulates the fading of the signal that would be experienced by a signal being transmitted along a real channel, thereby enabling an artificially faded signal to be transmitted directly onto a device under test (DUT). By providing an artificially faded signal to a DUT, various features of the DUT may be tested, such as for example the performance of its receiver antenna configuration.

For example, with reference to FIG. 1 a channel emulator 10 may be used to generate a test signal which is amplified by a power amplifier 12 and delivered to the DUT 14 by eight transmitting probes 16 of an anechoic chamber 18. The channel emulator 10 comprises a base station emulator 20 which simulates the unfaded signal emitted by a base station, and a downlink fading emulator 22 which simulates the fading of the signal along different paths. Since each path represents reflection off a different object or 'cluster', two or more probes may be required to generate a beam that arrives at the DUT with the correct power angular spectrum. Thus, the probes collaborate to simulate correctly each of several incoming beams.

In the known arrangement of FIG. 1, uplink transmission from the DUT to a base station is simulated by a single uplink probe 23 and a cable 24 routed to the base station emulator 20. The uplink probe 23 receives an uplink signal radiated by the DUT and transmits this through the cable 23 directly to the base station emulator 20. The uplink signal is not passed through a fading emulator. Thus, fading of the uplink channel is not emulated in this known system, and as a result, this arrangement only provides over-the-air (OTA) testing for downlink transmission.

In another approach, it is known to enable OTA testing of a DUT by providing an anechoic chamber with OTA probes capable of both transmitting and receiving radio signals. For example, as shown in FIG. 2, an anechoic chamber 30 has eight transceiving probes 32, each of which comprises a transmitter for simulating incoming beams arriving at the DUT and a receiver for capturing signals transmitted by the DUT. In this approach, OTA fading of both the uplink and downlink channels is emulated. For the downlink channel, transmission from a base station is simulated by a base station emulator 34 of a channel emulator 36, and fading is introduced by a downlink fading emulator 38. The signals are amplified by a power amplifier 40 and routed to the probes 32 along cables 42 by a transmitter/receiver separation unit 44. For the uplink channel, signals transmitted by the DUT are captured by the probes 32 and fed along the same cables 42 to the transmitter/receiver separation unit 44. From here, the signals are amplified at a power amplifier 46 and fading is introduced by an uplink fading emulator 48.

Thus, OTA testing may be performed on a DUT for both transmitting and receiving radio signals. However, this approach only works when the uplink and downlink probes are positioned at the same locations in the anechoic chamber, and by implication when there are the same numbers of uplink and downlink probes.

However, in some circumstances there are fewer uplink probes than downlink probes. This may for example be because it is expensive to upgrade systems of the type shown in FIG. 1 by adding uplink probes and fading emulators. Furthermore, there may be fewer uplink probes by design if a subscriber terminal has fewer transmitting antennas than receiving antennas and the smaller transmitting antenna array size requires fewer uplink probes for the same accuracy of OTA testing. It is also a consideration that full duplex emulations—i.e. those simulating both uplink fading as well as downlink fading—are needed less often.

It is accordingly an object of the invention to provide an improved system for emulating an over-the-air channel for communicating with a device under test.

SUMMARY OF THE INVENTION

In a first aspect the invention provides a system for emulating an over-the-air channel for communicating with a device under test. The system comprises an anechoic chamber having $N_A$ primary probes and $N_B$ secondary probes where $N_A > N_B$; a dividing module for dividing $N_A$ primary impulse responses $\{\mu_{n_A}\}$ into $N_B$ subsets; and a defining module for defining $N_B$ secondary impulse responses $\{v_{n_B}\}$ in terms of the primary impulse responses $\{\mu_{n_A}\}$ and a set of $N_B$ complex sequences $\{\lambda_{n_B}\}$. In the system, either the primary probes are downlink probes, the primary impulse responses are downlink impulse responses, the secondary probes are uplink probes and the secondary impulse responses are uplink impulse responses, or the primary probes are uplink probes, the primary impulse responses are uplink impulse responses, the secondary probes are downlink probes and the secondary impulse responses are downlink impulse responses.

Optionally, the defining module is arranged to define the $n_B$th secondary impulse response $v_{n_B}$ in terms of the primary impulse responses $\{_{n_A}\}$ belonging to the $n_B$th subset and the $n_B$th complex sequence $\lambda_{n_B}$.

Optionally, the system comprises a setting module for setting a correlation between a primary channel model $h_A=\Sigma_{n_A}\sqrt{g_{n_A}}\cdot\mu_{n_A}$ of the over-the-air channel and a secondary channel model $h_B=\Sigma_{n_B}\sqrt{w_{n_B}}\cdot v_{n_B}$ of the over-the-air channel to a predetermined value.

Optionally, the defining module is arranged to define the $n_B$th secondary impulse response $v_{n_B}$ on the basis of the correlation having been set to the predetermined value.

Optionally, the setting module is arranged to determine, on the basis of having set the correlation to the predetermined value, a coefficient $c_{n_B}$ for building the $n_B$th secondary impulse response $v_{n_B}$ from the primary impulse responses $\{\mu_{n_A}\}$ belonging to the $n_B$th subset and the $n_B$th complex sequence $\lambda_{n_B}$.

Optionally, the coefficients $\{c_{n_B}\}$ are in dependence on the secondary weights $\{w_{n_B}\}$, the primary weights $\{g_{n_A}\}$, and how the primary impulse responses are divided into $N_B$ subsets.

Optionally, the setting module is arranged to determine the coefficients $\{c_{n_B}\}$ by solving $$\sum_{n_B} c_{n_B} \cdot \sqrt{w_{n_B}} \cdot \sum_{i=1}^{I_{n_B}} \sqrt{g_{i+\Sigma_{m=1}^{n_B} I_{m-1}}} = \rho_t$$

for $\{c_{n_B}\}$, where $I_{n_B}$ is the number of primary impulse responses $\{\mu_{n_A}\}$ in the $n_B$th subset and $\rho_t$ is the predetermined value of the correlation.

Optionally, the defining module is arranged to define the $n_B$th secondary impulse response $v_{n_B}$ using $$v_{n_B} = \frac{(1-\hat{c}_{n_B})\cdot\lambda_{n_B} + \hat{c}_{n_B} \cdot \sum_{i=1}^{I_{n_B}} \mu_{i+\Sigma_{m=1}^{n_B} I_{m-1}}}{\sqrt{|1-\hat{c}_{n_B}|^2 + I_{n_B}\cdot|\hat{c}_{n_B}|^2}}$$

where $\hat{c}_{n_B}$ is defined by $$c_{n_B} = \frac{\hat{c}_{n_B}}{\sqrt{|1-\hat{c}_{n_B}|^2 + I_{n_B}\cdot|\hat{c}_{n_B}|^2}}.$$

Optionally, the $N_B$ complex sequences $\lambda_{n_B}$ are independent and identically distributed.

Optionally, the communicating is by time-division duplexing and the predetermined value is one.

Optionally, the communicating is by frequency-division duplexing and the predetermined value is between zero and one.

Optionally, the subsets are of equal size.

Optionally, the subsets are of unequal sizes.

Optionally, the over-the-air channel has a uniform power angular spectrum.

Optionally, the over-the-air channel comprises a Laplacian shaped spatial cluster.

Optionally, the over-the-air channel is a radio frequency channel.

Optionally, the device under test is a subscriber terminal.

Optionally, the device under test is a cell phone.

Optionally, the anechoic chamber is arranged to: emulate downlink transmission to the device under test by forming a beam with at least one of the downlink probes on the basis of the primary channel model $h_A$; and emulate uplink transmission from the device under test by capturing a signal from the device under test with at least one of the uplink probes and artificially fading the signal on the basis of the secondary channel model $h_B$.

Optionally, the anechoic chamber is arranged to: emulate downlink transmission to the device under test by forming a beam with at least one of the downlink probes on the basis of the secondary channel model $h_B$; and emulate uplink transmission from the device under test by capturing a signal from the device under test with at least one of the uplink probes and artificially fading the signal on the basis of the primary channel model $h_A$.

In a second aspect the invention provides a method of emulating an over-the-air channel for communicating with a device under test in an anechoic chamber having $N_A$ primary probes and $N_B$ secondary probes where $N_A > N_B$. The method comprises dividing $N_A$ primary impulse responses $\{\mu_{n_A}\}$ into $N_B$ subsets; and defining $N_B$ secondary impulse responses $\{v_{n_B}\}$ in terms of the primary impulse responses $\{\mu_{n_A}\}$ and a set of $N_B$ complex sequences $\{\lambda_{n_B}\}$. In the method, either the primary probes are downlink probes, the primary impulse responses are downlink impulse responses, the secondary probes are uplink probes and the secondary impulse responses are uplink impulse responses, or the primary probes are uplink probes, the primary impulse responses are uplink impulse responses, the secondary probes are downlink probes and the secondary impulse responses are downlink impulse responses.

Optionally, the method comprises defining the $n_B$th secondary impulse response $v_{n_B}$ in terms of the primary responses $\{\mu_{n_A}\}$ belonging to the $n_B$th subset and the $n_B$th complex sequence $\lambda_{n_B}$.

Optionally, the method comprises setting a correlation between a primary channel model $h_A=\Sigma_{n_A}\sqrt{g_{n_A}}\cdot\mu_{n_A}$ of the over-the-air channel and a secondary channel model $h_B=\Sigma_{n_B}\sqrt{w_{n_B}}\cdot v_{n_B}$ of the over-the-air channel to a predetermined value.

Optionally, the method comprises defining the $n_B$th secondary impulse response $v_{n_B}$ on the basis of the correlation having been set to the predetermined value.

Optionally, the method comprises determining, on the basis of having set the correlation to the predetermined value, a coefficient $c_{n_B}$ for building the $n_B$th secondary impulse response $v_{n_B}$ from the primary impulse responses $\{\mu_{n_A}\}$ belonging to the $n_B$th subset and the $n_B$th complex sequence $\lambda_{n_B}$.

Optionally, the coefficients $\{c_{n_B}\}$ are in dependence on the secondary weights $\{w_{n_B}\}$, the primary weights $\{g_{n_A}\}$, and how the primary impulse responses are divided into $N_B$ subsets.

Optionally, determining the coefficients $\{c_{n_B}\}$ involves solving $$\sum_{n_B} c_{n_B} \cdot \sqrt{w_{n_B}} \cdot \sum_{i=1}^{I_{n_B}} \sqrt{g_{i+\Sigma_{m=1}^{n_B} I_{m-1}}} = \rho_t$$

for $\{c_{n_B}\}$, where $I_{n_B}$ is the number of primary impulse responses $\{\mu_{n_A}\}$ in the $n_B$th subset and $\rho_t$ is the predetermined value of the correlation.

Optionally, the method comprises defining the $n_B$th secondary impulse response $v_{n_B}$ using $$v_{n_B} = \frac{(1-\hat{c}_{n_B})\cdot\lambda_{n_B} + \hat{c}_{n_B}\cdot\sum_{i=1}^{I_{n_B}}\mu_{i+\Sigma_{m=1}^{n_B}I_{m-1}}}{\sqrt{|1-\hat{c}_{n_B}|^2 + I_{n_B}\cdot|\hat{c}_{n_B}|^2}}$$

where $\hat{c}_{n_B}$ is defined by $$c_{n_B} = \frac{\hat{c}_{n_B}}{\sqrt{|1-\hat{c}_{n_B}|^2 + I_{n_B}\cdot|\hat{c}_{n_B}|^2}}.$$

Optionally, the $N_B$ complex sequences $\{\lambda_{n_B}\}$ are independent and identically distributed.

Optionally, the communicating is by time-division duplexing and the predetermined value is one.

Optionally, the communicating is by frequency-division duplexing and the predetermined value is between zero and one.

Optionally, the subsets are of equal size.

Optionally, the subsets are of unequal sizes.

Optionally, the over-the-air channel has a uniform power angular spectrum.

Optionally, the over-the-air channel comprises a Laplacian shaped spatial cluster.

Optionally, the over-the-air channel is a radio frequency channel.

Optionally, the device under test is a subscriber terminal.

Optionally, the device under test is a cell phone.

Optionally, the method comprises emulating downlink transmission to the device under test by forming a beam with at least one of the downlink probes on the basis of the primary channel model $h_A$; and emulating uplink transmission from the device under test by capturing a signal from the device under test with at least one of the uplink probes and artificially fading the signal on the basis of the secondary channel model $h_B$.

Optionally, the method comprises emulating downlink transmission to the device under test by forming a beam with at least one of the downlink probes on the basis of the secondary channel model $h_B$; and emulating uplink transmission from the device under test by capturing a signal from the device under test with at least one of the uplink probes and artificially fading the signal on the basis of the primary channel model $h_A$.

In a third aspect the invention provides computer program code which when run on a computer causes the computer to perform a method according to the second aspect.

In a fourth aspect the invention provides a carrier medium carrying computer readable code which when run on a computer causes the computer to perform a method according to the second aspect.

In a fifth aspect the invention provides a computer program product comprising any such computer readable code.

In a sixth aspect the invention provides an integrated circuit configured to perform a method according to the second aspect.

In a seventh aspect the invention provides an article of manufacture for emulating an over-the-air channel. The article of manufacture comprises a machine-readable storage medium; and executable program instructions embodied in the machine readable storage medium that when executed by a programmable system causes the system to perform a method according to the second aspect.

In an eighth aspect the invention provides a device for emulating an over-the-air channel. The device comprises a machine-readable storage medium; and executable program instructions embodied in the machine readable storage medium that when executed by a programmable system causes the system to perform a method according to the second aspect.

In a ninth aspect the invention provides an uplink fading emulator for emulating an over-the-air channel. The device comprises a machine-readable storage medium; and executable program instructions embodied in the machine readable storage medium that when executed by a programmable system causes the system to perform a method according to the second aspect.

In a tenth aspect the invention provides a downlink fading emulator for emulating an over-the-air channel. The device comprises a machine-readable storage medium; and executable program instructions embodied in the machine readable storage medium that when executed by a programmable system causes the system to perform a method according to the second aspect.

The invention further provides systems, devices, computer-implemented apparatus and articles of manufacture for implementing any of the aforementioned aspects of the invention; computer program code configured to perform the steps according to any one of the aforementioned methods; a computer program product carrying program code configured to perform the steps according to any one of the aforementioned methods; and a computer readable medium carrying the computer program.

DESCRIPTION OF THE DRAWINGS

The invention will now be described in detail with reference to the following drawings of which.

Throughout the drawings, like reference symbols refer to like features or steps.

DETAILED DESCRIPTION OF THE INVENTION

Figure 1:
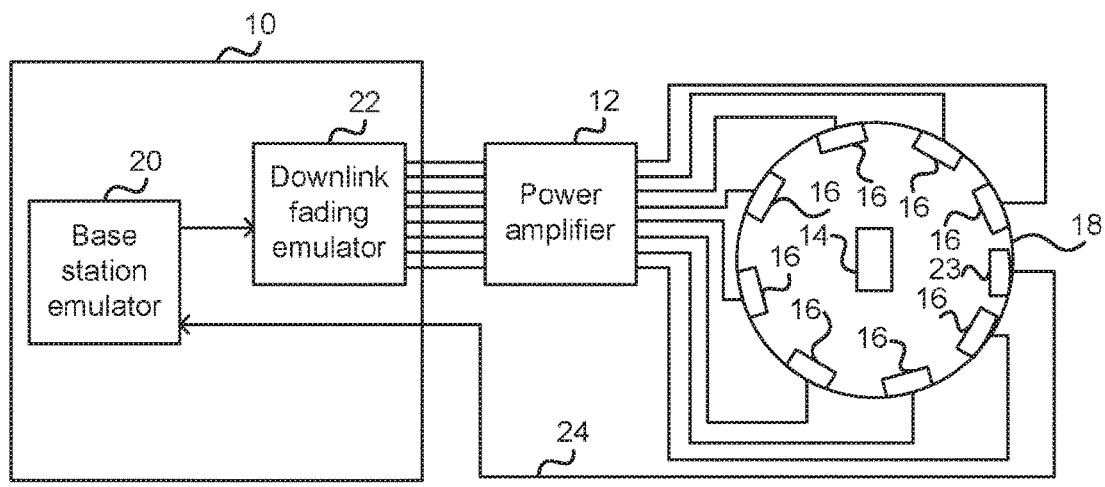
FIG. 1 is a block diagram of a conventional OTA testing system including a channel emulator and an anechoic chamber.
Figure 2:
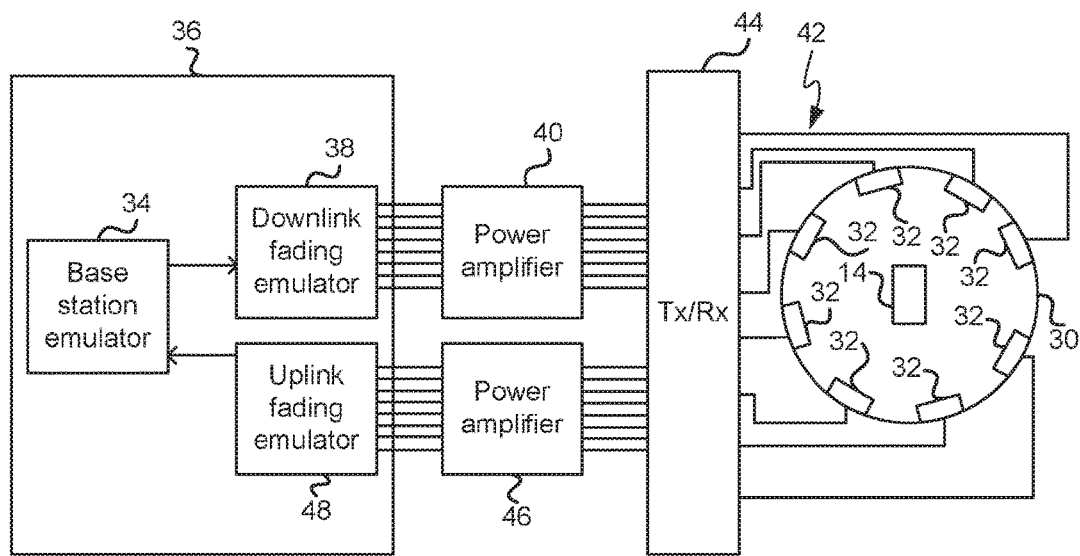
FIG. 2 is a block diagram of a conventional OTA testing system including a channel emulator and an anechoic chamber.
Figure 3:
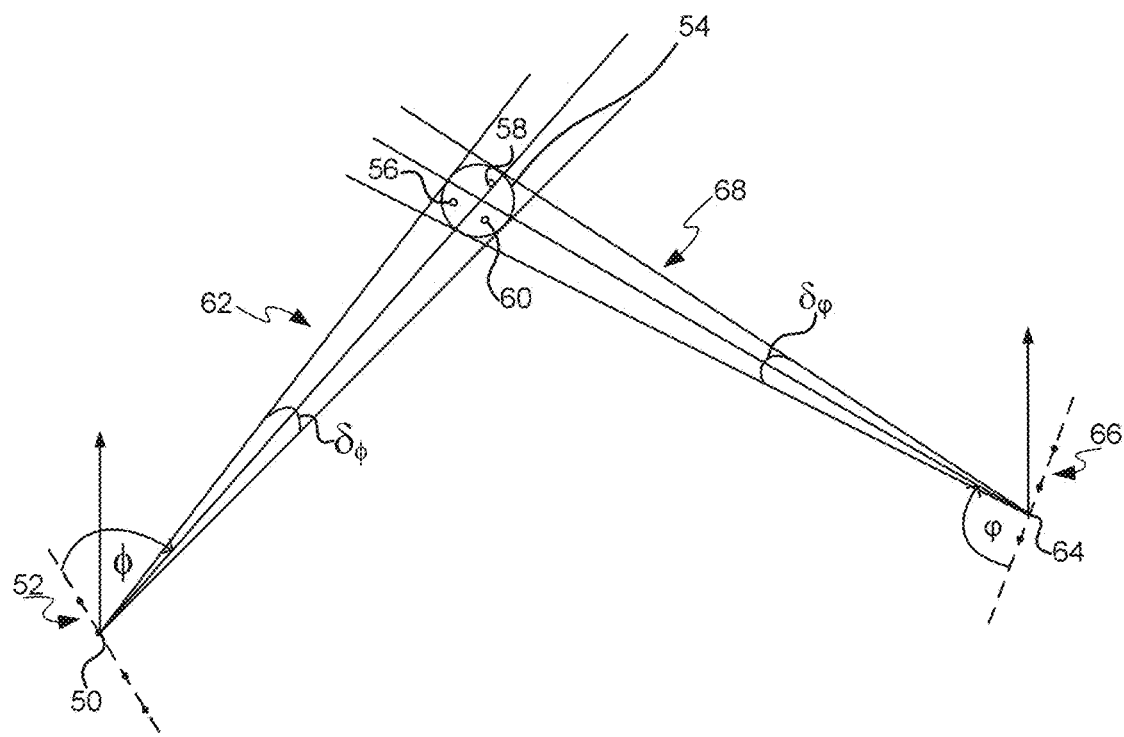
FIG. 3 is a ray diagram illustrating propagation of a radio signal from a transmitter to a receiver via a cluster.

As shown in FIG. 3, radio signal may be transmitted by an antenna 50 of a transmitter 52 at an angle of departure (AoD) of $\phi$ and arrive at a cluster 54 where it is absorbed, reflected and scattered. In this example and in the description that follows, the radio channel has only one path. However, it is noted that in other examples a signal may reflect off multiple clusters and arrive at a receiver by multiple paths. In the multi-path scenario, embodiments of the invention take account of the multiple clusters by using a downlink channel model comprising a summation of the multiple paths. Returning to FIG. 3 and the single-cluster example, the cluster 54, which represents an object such as a mountain or a building, is made up of active regions 56, 58 and 60 which predominantly reflect and scatter the transmitted beam 62 and may represent some finer structural features of the object. Part of the radiation leaving the cluster is reflected towards an antenna 64 of a receiver 66 in a reflected beam 68, arriving with an angle of arrival (AoA) of $\phi$. If the signal arrives at the receiver along a number of paths having been reflected off several clusters, the paths additively contribute to the total radio channel existing between the transmitter 52 and the receiver 66. The transmitter 52 may for example represent a base station of a radio communication system and the receiver 66 may represent a subscriber terminal.

The channel may be characterised by various further parameters. For example, since the lengths of the paths are different distances, it takes the signal different times to propagate along each of the paths. The delays introduced by each of the paths mean that signals reflected by different clusters arrive at the receiver 66 at different times. The total signal transmitted in the channel can be said to be made up of different 'taps' each propagating along a different path.

A beam arriving at a receiver may also be characterised by a power angular spectrum (PAS) of the cluster off which it reflects. For example, depending on the structure and shape of the cluster, the beam will be attenuated and reflected in different ways—for example according to a Laplacian PAS or otherwise-shaped distribution. The spread of the transmitted and reflected beams may be summarised by an angular spread which may for example be an integer multiple of the standard deviation in the PAS of the beam. Referring to FIG. 3, the transmitted beam 62 has an angular spread of $\delta_\phi$ and the reflected beam 68 has an angular spread of $\delta_\varphi$.

The cluster 54 and/or receiver 66 may be moving, in which case an expression for the reflected beam 68 detected by the receiver 66 needs to include terms to account for the Doppler effect. Other conditions, such as the geometry of the transmitting and receiving antennas may also need to be taken into account in a model of the channel. For example, the transmitter antenna array may be a Uniform Linear Array with an associated field shape.

Figure 4:
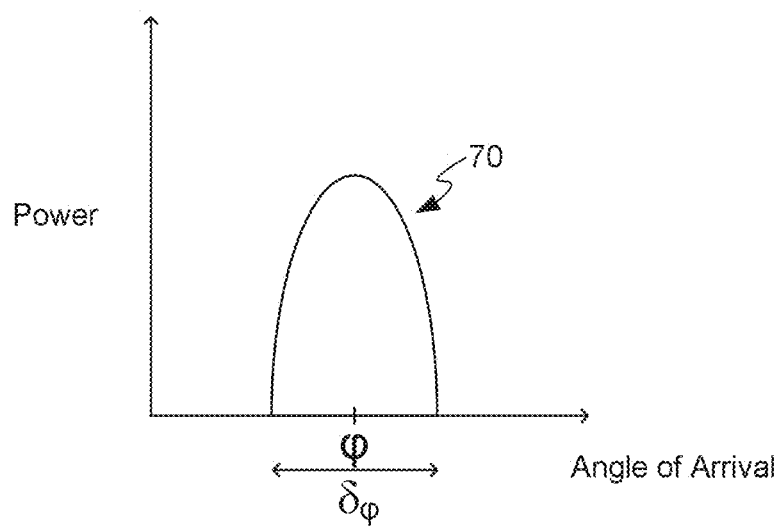
FIG. 4 is a graph illustrating the angular power spectrum of the beam of FIG. 3 as it arrives at the receiver.
Figure 5:
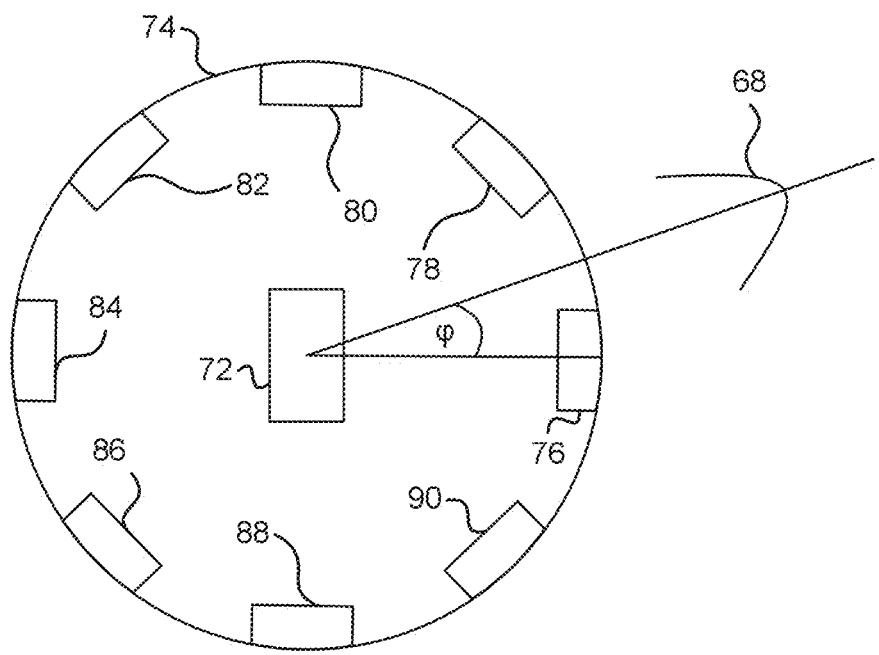
FIG. 5 is a schematic diagram illustrating a beam to be simulated by probes of an anechoic chamber.
Figure 6:
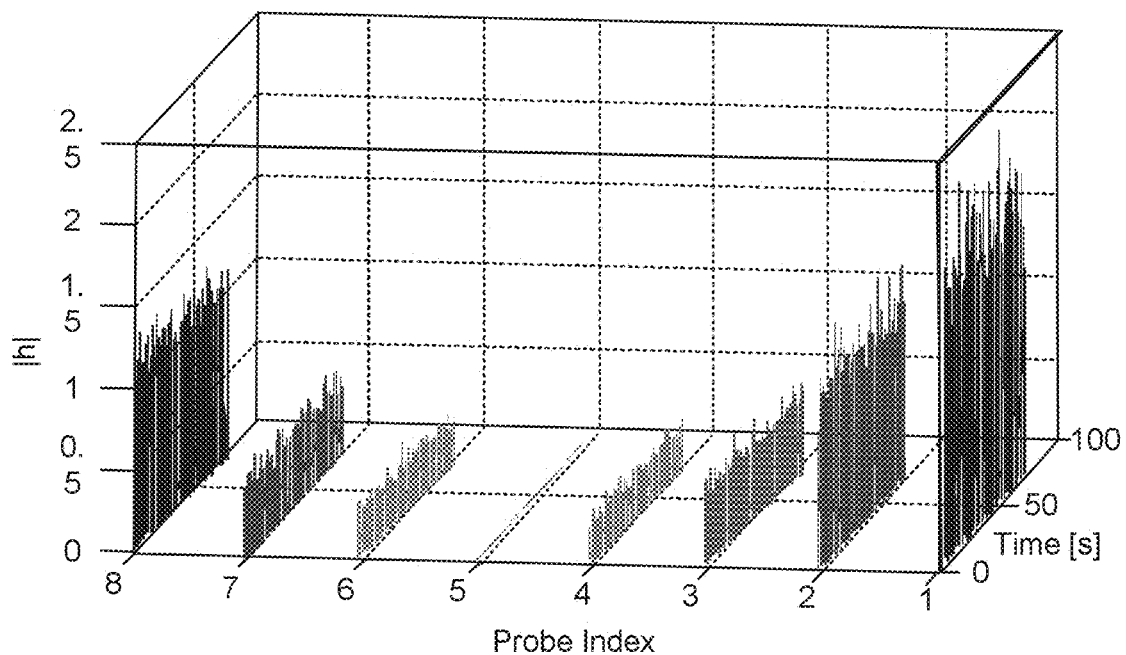
FIG. 6 is a graph illustrating power weightings of the probes of FIG. 5 for simulating a beam with a Laplacian power spectrum.

With reference to FIG. 4, the reflected beam 68 arrives at the receiving antenna 64 with a power spectrum 70 centred on an angle of $\psi$ with an angular spread of $\delta_\varphi$. In order to test the accuracy with which a DUT detects the reflected beam 68, a beam can be simulated and directed to the DUT so that it arrives at the DUT with the power spectrum shown in FIG. 4. For example, a DUT 72 may be placed inside an anechoic chamber 74 with eight probes 76, 78, 80, 82, 84, 86, 88 and 90 as shown in FIG. 5. The probes 76, 78, 80, 82, 84, 86, 88 and 90 are caused to transmit signals that add up to simulate the power spectrum 70 at the location of the DUT 72. In order to map the power spectrum 70 of the cluster 54 to the set of probes, a prefaded signal synthesis method is used as is known in the art. The result is a series of downlink impulse responses $\{\mu_{n_d}\}$ weighted by power weights $\{g_{n_d}\}$. The downlink impulse responses $\{n_d\}$ are independent and identically distributed complex sequences and the weights $\{g_{n_d}\}$ represent the relative powers of transmission of the probes. For example, to simulate a beam with a Laplacian power spectrum using an anechoic chamber with eight probes, relative powers of transmission may be used as shown in FIG. 6.

In general, the total downlink channel $h_d$ experienced by a DUT may be expressed as the sum of the weighted downlink impulse responses of each of the probes:

$$h_d = \sum_{n_d} \sqrt{g_{n_d}} \cdot \mu_{n_d}$$

In the same way that the transmitting probes may together simulate a pre-faded signal, the receiving probes of an anechoic chamber may together capture a signal from a DUT and add artificial fading to that signal to emulate the fading that would have taken place as it propagated back along the radio channel towards, for example, a radio base station. A mapping of the uplink channel to each of the uplink probes is therefore required for adding uplink fading. Assuming that the radio channel uses time-division duplexing (TDD), if the number of downlink probes $N_d$ is equal to the number of uplink probes $N_u$, and the respective uplink and downlink probes are positioned at the same angular locations in the anechoic chamber, the same mapping that has been applied to the downlink probes can also be used for the uplink probes. This is to say that if $N_u=N_d$ and $n_u=n_d$, the $n_u$th uplink impulse response $v_{n_u}$ is equal to the $n_d$th downlink impulse response $\mu_{n_d}$, and the $n_u$th power weight $w_{n_u}$ is equal to the $n_d$th power weight $g_{n_d}$. As a result, the downlink channel $h_d$ is equal to the uplink channel $h_u$ as follows:

$$h_d = \sum_{n_d} \sqrt{g_{n_d}} \cdot \mu_{n_d} = \sum_{n_u} \sqrt{w_{n_u}} \cdot v_{n_u} = h_u$$

In the case of frequency-division duplexing (FDD), the uplink frequency $f_u$ is different to the downlink frequency $f_d$. Thus, even with $N_u=N_d$ and $n_u=n_d$, the uplink and downlink impulse responses are not identical:

$$\mu_{n_d}=\mu_{n_d}(f_d) \neq v_{n_u}(f_u)=v_{n_u}$$

However, the uplink and downlink channels may still be modelled with the same functions in FDD: the only difference is that the frequency variable takes different values in each case.

Figure 7:
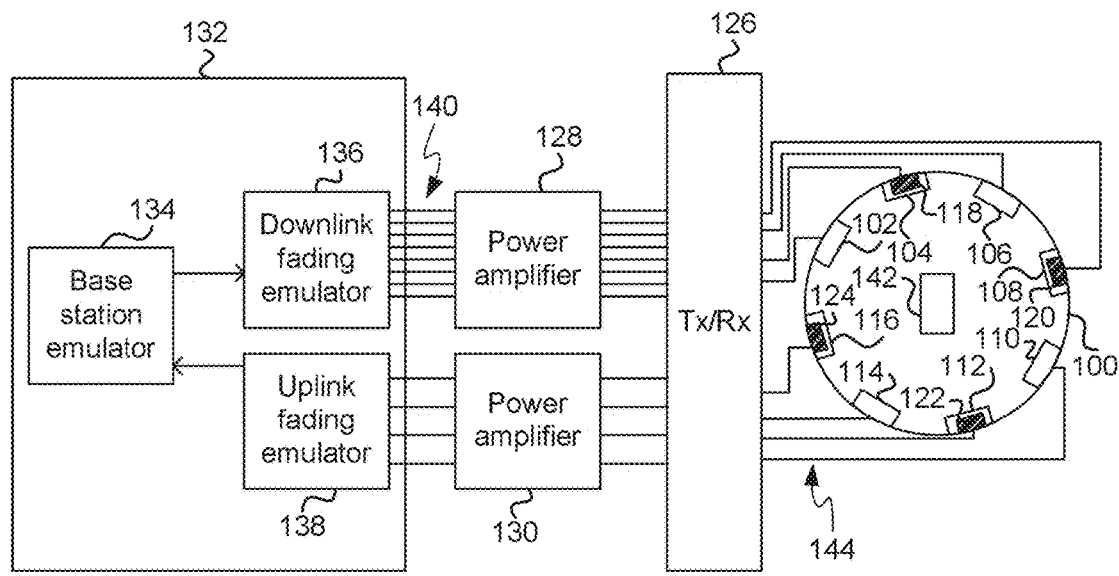
FIG. 7 is a block diagram of an OTA testing system including a channel emulator, two power amplifiers and an anechoic chamber according to an embodiment of the invention.

The situation is different when there are different numbers of uplink and downlink probes. For example, the anechoic chamber 100 of FIG. 7 has eight downlink probes 102, 104, 106, 108, 110, 112, 114 and 116, and only four uplink probes 118, 120, 122 and 124. In this example the eight downlink probes 102, 104, 106, 108, 110, 112, 114 and 116 are equally spaced and the four uplink probes 118, 120, 122 and 124 are collocated with four of the downlink probes 104, 108, 112 and 116. In general, the uplink and downlink probes may be located freely, and in some embodiments of the invention the uplink probes are not collocated with downlink probes. Returning to the example of FIG. 7, the probes of the anechoic chamber 100 are coupled to a transmitter/receiver separation unit 126 which is in turn coupled to power amplifiers 128 and 130 and finally to a channel emulator 132 comprising a base station emulator 134 and downlink and uplink fading emulators 136 and 138. The downlink fading emulator 136 adds fading to a signal generated by the base station emulator 134 and transmits this along cables 140 to the power amplifier 128. The amplified signals are transmitted to the transmitter/receiver separation unit 126 which routes them to the appropriate downlink probes 102, 104, 106, 108, 110, 112, 114 and 116 for simulating a beam inside the anechoic chamber 100. Similarly, signals transmitted by a DUT 142 are captured by the uplink probes 118, 120, 122 and 124, conveyed to the transmitter/receiver separation unit 126 along the cables 144, routed to the power amplifier 130 and conveyed to the uplink fading emulator 138 where uplink fading is simulated. In this case, since there are different numbers of uplink and downlink probes, the uplink channel cannot be defined by matching up the downlink impulse responses and downlink power weights with corresponding uplink impulse responses and uplink power weights. Furthermore, if the uplink channel were defined from scratch using the prefaded signal synthesis method, the resulting uplink channel model would not be correctly correlated with the downlink channel model. In fact, in that case the uplink impulse responses $\{v_{n_u}\}$ and downlink impulse responses $\{\mu_{n_d}\}$ would be independent, identically correlated complex sequences and as a result the uplink and downlink channel models, $h_u$ and $h_d$, would be fully uncorrelated. Correlation between real uplink and downlink radio channels, which must be emulated as accurately as possible by simulated channels, is as follows.

In TDD the uplink and downlink radio frequencies are the same so the uplink and downlink channels are identical and fully correlated:

$$\rho = \text{corr}(h_d, h_u) = \frac{\text{cov}(h_d, h_u)}{\sqrt{\text{cov}(h_d, h_d) \cdot \text{cov}(h_u, h_u)}} = 1,$$

where corr( ) and cov( ) are the correlation and covariance operators respectively.

In FDD the uplink and downlink radio frequencies are different so the uplink and downlink channels are not equal and they are either partially correlated or not correlated depending on their frequency separation:

$$\rho = \text{corr}(h_d, h_u) < 1$$

In order to simulate uplink and downlink radio channels that are correctly correlated using an anechoic chamber with different numbers of uplink and downlink probes, the following approach is used. The approach is described for the case where there are fewer uplink probes than there are downlink probes,—i.e. $N_u < N_d$. In this case, as described in detail below, the downlink impulse responses $\{\mu_{n_d}\}$ are used to create uplink impulse responses $\{v_{n_u}\}$. However, in the case where there are fewer downlink probes than uplink probes, the same approach may be used to create the downlink impulse responses $\{\mu_{n_d}\}$ from the uplink impulse responses $\{v_{n_u}\}$. Returning to the main example when $N_u < N_d$, the approach starts with mapping the downlink channel to the $N_d$ downlink probes using prefaded signal synthesis methods in the same way as described above. This results in an expression for the downlink channel $h_d$ as follows.

$$h_d = \sum_{n_d} \sqrt{g_{n_d}} \cdot \mu_{n_d}$$

Figure 8:
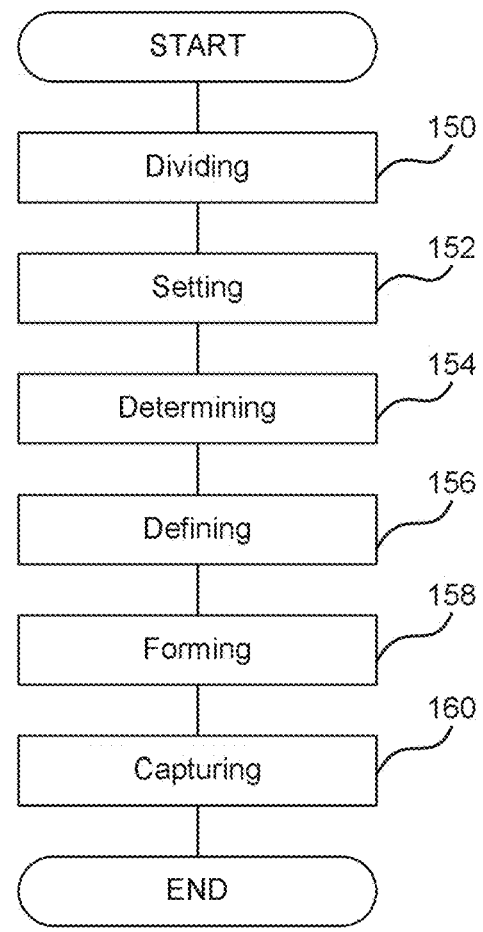
FIG. 8 is a flow diagram illustrating a method of emulating an OTA channel that may be performed by an OTA testing system according to an embodiment of the invention.

With reference to FIG. 8, from this starting point the $N_d$ downlink impulse responses $\{\mu_{n_d}\}$ are divided into $N_u$ subsets (step 150) so that the $n_u$th uplink impulse response $v_{n_u}$ has an associated $n_u$th subset of downlink responses $\{\mu_{n_d}\}$. In this case, although we have $N_u < N_d$, there is no restriction on how the $N_d$ downlink impulse responses $\{\mu_{n_d}\}$ are divided into $N_u$ subsets. For example, the downlink impulse responses $\{\mu_{n_d}\}$ may be divided equally so that the number $I_{n_u}$ of downlink impulse responses $\{\mu_{n_d}\}$ in the $n_u$th subset is constant. Alternatively, the subsets may contain different numbers of downlink impulse responses $\{\mu_{n_d}\}$ so that the number $I_{n_u}$ varies between subsets with $I_{n_u} \geq 1$. In either case, the ith downlink impulse response in the $n_u$th subset corresponds to the $(i+\Sigma_{m=1}^{n_u} I_{m-1})$th downlink impulse response from the set of $N_d$ downlink impulse responses $\{\mu_{n_d}\}$. It will be appreciated that in this example which is described further below, the downlink impulse responses are grouped in a sequential order: for example, eight downlink impulse responses could be grouped into three subgroups $\{\mu_1,\mu_2,\}$, $\{\mu_3,\mu_4,\mu_5\}$ and $\{\mu_6,\mu_7,\mu_8\}$. In other examples the downlink impulse responses may be grouped randomly, such as for example grouping eight downlink impulse responses as $\{\mu_7,\mu_8,\}$, $\{\mu_1,\mu_4,\mu_6\}$ and $\{\mu_2,\mu_3,\mu_5\}$.

The goal is now to obtain a model for the uplink channel $$h_u = \sum_{n_u} \sqrt{w_{n_u}} \cdot v_{n_u}$$

by expressing the uplink impulse responses $\{v_{n_u}\}$ in terms of (i) the downlink impulse responses $\{\mu_{n_d}\}$ belonging to the $n_u$th subset and (ii) an $n_u$th sequence $\lambda_{n_u}$ from a set of $N_u$ independent and identically distributed complex sequences. This involves expressing the uplink impulses $\{v_{n_u}\}$ in the form $$v_{n_u} = a\lambda_{n_u} + b\sum_{i=1}^{I_{n_u}} \mu_{i+\Sigma_{m=1}^{n_u} I_{m-1}}$$

where a and b are numbers to be calculated.

The goal is achieved by firstly setting the correlation $\rho = \text{corr}(h_d, h_u)$ between the simulated uplink and downlink channels to a predetermined target value $\rho_t$ (step 152). The target correlation $\rho_t$ is the correlation between the real uplink and downlink channels of the radio channel being emulated and can be calculated by methods known in the art. For example, the correlation between the real uplink and downlink channels may be calculated using the frequency correlation function (FCF) of the uplink and downlink radio channels. The FCF may be obtained from a Fourier transform of a power delay profile of the channel. A correlation value corresponding to the frequency separation of the uplink and downlink bands is selected from the FCF as is known in the art. As indicated above, for TDD $\rho_t=1$ and for FDD $\rho_t<1$. It will be appreciated that since the target correlation $\rho_t$ depends only on the physical channel being emulated, it is independent of the apparatus for simulating it; in particular the target correlation $\rho_t$ is independent of the arrangement of probes in the anechoic chamber. As such, the target correlation $\rho_t$ places a requirement on the relationship between the simulated uplink and downlink channels, thereby enabling an expression for the uplink impulse responses $\{v_{n_u}\}$ to be constructed from building blocks consisting of the downlink impulse responses $\{\mu_{n_d}\}$ and the $N_u$ complex sequences $\{\lambda_{n_u}\}$.

For this, a set of $N_u$ coefficients $\{c_{n_u}\}$ is determined (step 154) by solving the following equation for $c_{n_u}$ $$\sum_{n_u} c_{n_u} \cdot \sqrt{w_{n_u}} \cdot \sum_{i=1}^{l_{n_u}} \sqrt{g_{i+\Sigma_{m=1}^{n_u} l_{m-1}}} = \rho_t$$

where $w_{n_u}$ is the power weighting of the $n_u$th uplink impulse response $v_{n_u}$ and $g_{i+\Sigma_{m=1}^{n_u} l_{m-1}}$ is the $(i+\Sigma_{m=1}^{n_u} l_{m-1})$th downlink power weighting in the $n_u$th subset. It will be appreciated that since $N_u$ coefficients $\{c_{n_u}\}$ are to be determined using a single equation, there are infinite solutions. However, any solution may be used for which $\{c_{n_u}\}$ does not exceed its maximum value—i.e. for which $$c_{n_u} < \frac{1}{\sqrt{l_{n_u}}}.$$

The weights $\{w_{n_u}\}$ are determined based on the uplink probe configuration and the target PAS. Similarly, the weights $\{g_{n_d}\}$ are obtained based on the downlink probe configuration and the target PAS, and the target PAS is the same for uplink and downlink.

The $n_u$th uplink impulse $v_{n_u}$ may then be defined (step 156) in terms of the downlink impulse responses $\{\mu_{n_d}\}$ belonging to the $n_u$th subset and the $n_u$th complex sequence $\lambda_{n_u}$ as follows:

$$v_{n_u} = \frac{(1-\hat{c}_{n_u}) \cdot \lambda_{n_u} + \hat{c}_{n_u} \cdot \sum_{i=1}^{l_{n_u}} \mu_{i+\Sigma_{m=1}^{n_u} l_{m-1}}}{\sqrt{|1-\hat{c}_{n_u}|^2 + l_{n_u} \cdot |\hat{c}_{n_u}|^2}}$$

where $\hat{c}_{n_u}$ may be calculated by solving the equation $$c_{n_u} = \frac{\hat{c}_{n_u}}{\sqrt{|1-\hat{c}_{n_u}|^2 + l_{n_u} \cdot |\hat{c}_{n_u}|^2}}.$$

Thus, the calculation has delivered an expression for $\lambda_{n_u}$ of the form $$v_{n_u} = a\lambda_{n_u} + b\sum_{i=1}^{l_{n_u}} \mu_{i+\Sigma_{m=1}^{n_u} l_{m-1}}$$

as required above.

This expression for $v_{n_u}$ can be substituted into the uplink channel model $$h_u = \sum_{n_u} \sqrt{w_{n_u}} \cdot v_{n_u}$$

to provide a model for simulating the uplink radio channel using fewer uplink probes than downlink probes. As a result, full duplex testing of a DUT may be performed in an anechoic chamber having fewer uplink probes than downlink probes. The testing involves forming (step 158) a downlink beam with the $N_d$ downlink probes and by capturing (step 160) a signal from the DUT with the $N_u$ uplink probes and adding fading using the calculation above.

It will be appreciated from the expression above for $v_{n_u}$ that:

correlation between $v_{n_u}$ and the downlink impulse responses in the $n_u$th subset is $C_{n_u}$ since $$\mathrm{corr}\left(v_{n_u}, \mu_{i+\Sigma_{m=1}^{n_u} l_{m-1}}\right) = \frac{\hat{c}_{n_u}}{\sqrt{|1-\hat{c}_{n_u}|^2 + l_{n_u} \cdot |\hat{c}_{n_u}|^2}} = c_{n_u}$$

correlation between $v_{n_u}$ and the downlink impulse responses not in the $n_u$th subset is zero;

correlation between the uplink impulse responses $v_{n_u}$ is zero; and correlation between the downlink impulse responses $\mu_{n_d}$ is zero.

In order to provide a simple example of the calculation set out above, consider an anechoic chamber having $N_d=3$ downlink probes and $N_u=2$ uplink probes. The three downlink impulse responses are divided (step 150) into $N_u=2$ subsets, for example a first subset comprising the first downlink impulse response $\mu_1$ and a second subset comprising the second and third downlink impulse responses $\mu_2$ and $\mu_3$. The correlation between the simulated uplink and downlink channels is set to a target value of $\rho_t$ (step 152) and coefficients $c_1$ and $c_2$ are determined (step 154) by solving the equation $$c_1 \cdot \sqrt{w_1}\sqrt{g_1} + c_2 \cdot \sqrt{w_2}(\sqrt{g_2}+\sqrt{g_3}) = \rho_t$$

The two uplink impulse responses $v_1$ and $v_2$ can then be defined (step 156) as follows $$v_1 = \frac{(1-\hat{c}_1) \cdot \lambda_1 + \hat{c}_1 \cdot \mu_1}{\sqrt{|1-\hat{c}_1|^2 + |\hat{c}_1|^2}}$$

$$v_2 = \frac{(1-\hat{c}_2) \cdot \lambda_2 + \hat{c}_2 \cdot (\mu_2+\mu_3)}{\sqrt{|1-\hat{c}_2|^2 + 2|\hat{c}_2|^2}}$$

where $\hat{c}_1$ and $\hat{c}_2$ are found by solving the following two equations $$c_1 = \frac{\hat{c}_1}{\sqrt{|1-\hat{c}_1|^2 + |\hat{c}_1|^2}}$$

$$c_2 = \frac{\hat{c}_2}{\sqrt{|1-\hat{c}_2|^2 + 2|\hat{c}_2|^2}}$$

As mentioned above, in the case where communication is in TDD mode the target correlation $\rho_t$ is set to one and a set of $N_u$ corresponding coefficients $\{c_{n_u}\}$ is determined. In the case where communication is in FDD mode, the target correlation $\rho_t$ is less than one and may be set to any value between zero and one. As a result, for FDD mode solutions for $\{c_{n_u}\}$ may be determined for simulating uplink and downlink radio channels with an arbitrary target correlation $\rho_t$.

It will be appreciated that functions relating to OTA testing in an anechoic chamber having different numbers of uplink and downlink probes may be implemented on computers connected for data communication via the components of a packet data network. Although special purpose devices may be used, such devices also may be implemented using one or more hardware platforms intended to represent a general class of data processing device commonly used so as to implement the event identification functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. energy usage measurements for a time period already elapsed. The software code is executable by the general-purpose computer that functions as the server or terminal device used for OTA testing. In operation, the code is stored within the general-purpose computer platform. At other times, however, the software may be stored at other locations and/or transported for loading into the appropriate general-purpose computer system. Execution of such code by a processor of the computer platform or by a number of computer platforms enables the platform(s) to implement the methodology for OTA testing, in essentially the manner performed in the implementations discussed and illustrated herein.

Those skilled in the art will be familiar with the structure of general purpose computer hardware platforms. As will be appreciated, such a platform may be arranged to provide a computer with user interface elements, as may be used to implement a personal computer or other type of work station or terminal device. A general purpose computer hardware platform may also be arranged to provide a network or host computer platform, as may typically be used to implement a server.

For example, a server includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications.

A user terminal computer will include user interface elements for input and output, in addition to elements generally similar to those of the server computer, although the precise type, size, capacity, etc. of the respective elements will often different between server and client terminal computers. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of OTA testing outlined above may be embodied in programming. Program aspects of the technology may be thought of as "products" or "articles of manufacture" typically in the form of executable code and/or associated data that is carried on or embodied in a type of machine readable medium and/or in a plurality of such media. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the organisation providing OTA testing services into the OTA testing computer platform. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the OTA testing, etc. shown in the drawings. Volatile storage media include dynamic memory, such as main memory of such a computer platform. Tangible transmission media include coaxial cables; copper wire and fibre optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Figure 9:
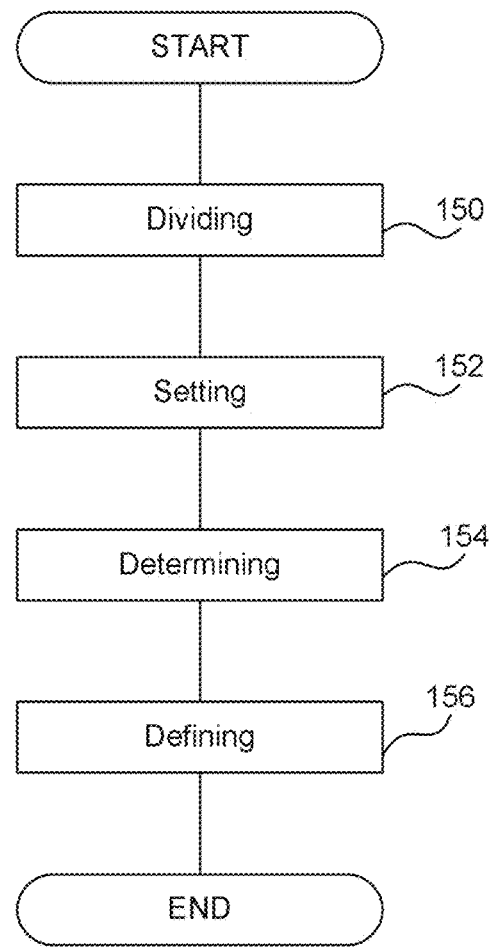
FIG. 9 is a flow diagram illustrating a method of emulating an OTA channel that may be performed by a channel emulator according to an embodiment of the invention.

With reference to FIG. 9, an uplink channel emulator may be arranged to perform the steps of dividing the $N_d$ downlink impulse responses into $N_u$ subsets (step 150), setting the correlation to a target value $\rho_t$ (step 152), determining coefficients $\{c_{n_u}\}$ (step 154) and defining the $N_u$ uplink impulse responses in accordance with the calculation set out above (step 156).

Figure 10:
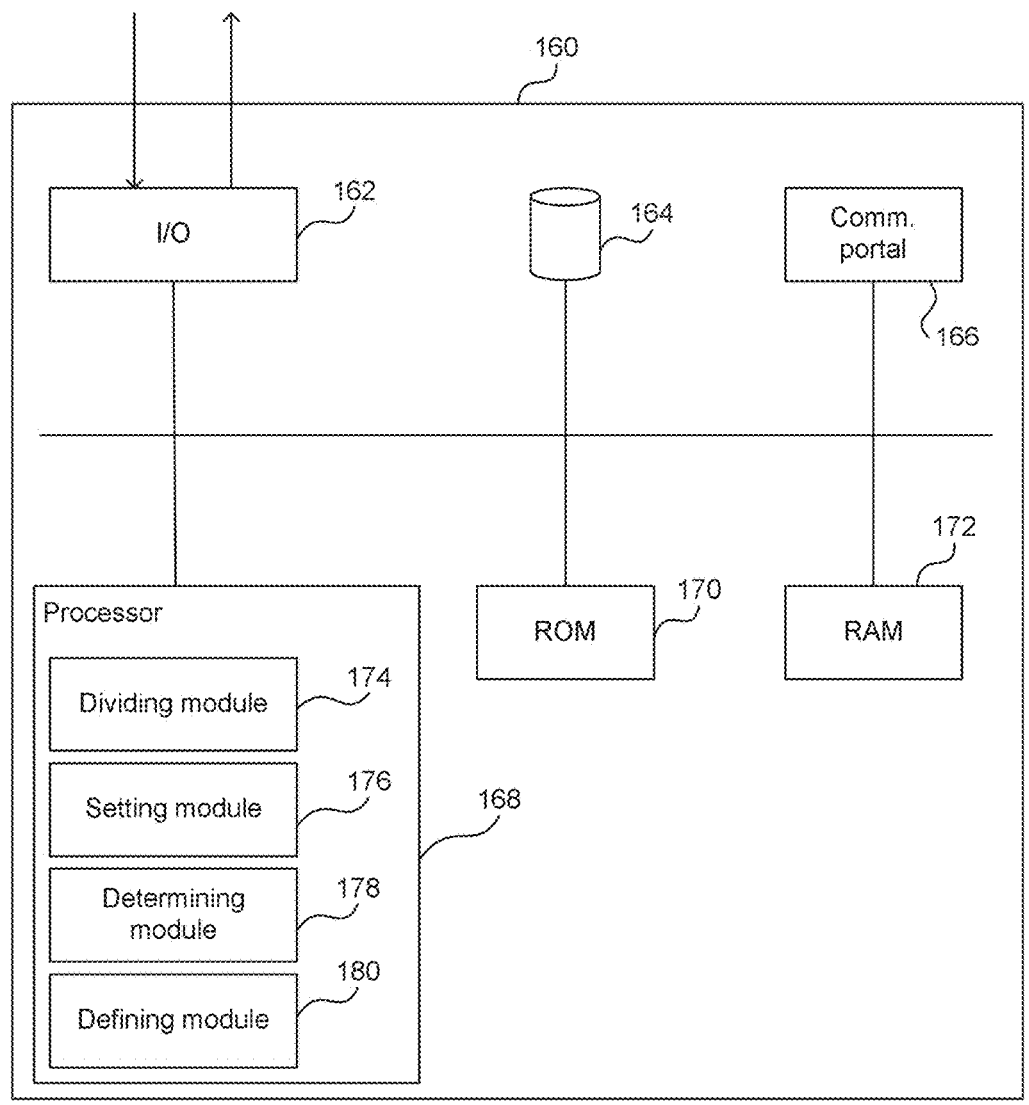
FIG. 10 is a block diagram illustrating an uplink channel emulator according to an embodiment of the invention.

A suitable uplink channel emulator 160 is shown in FIG. 10. The uplink channel emulator 160 comprises an input/output interface element 162, a database 164, a communications portal 166, a processor 168, ROM 170 and RAM 172. The processor 168 comprises a dividing module 174 arranged to perform the step 150 of dividing the $N_d$ downlink impulse responses into $N_u$ subsets, a setting module 176 arranged to perform the step 152 of setting the correlation to a target value $\rho_t$, a determining module 178 arranged to perform the step 154 of determining coefficients $\{c_{n_u}\}$, and a defining module 180 arranged to perform the step 156 of defining the $N_u$ uplink impulse responses. The database 164 may, for example, store data relating to how the steps 150, 152, 154 and 156 are carried out. Input data that is provided to the processor 168 via the input/output interface element 162 may include details of the arrangement of the probes of an anechoic chamber, such as the number $N_u$ of uplink probes and the number $N_d$ of downlink probes, and data characterising the radio channel to be emulated. An output of the uplink channel emulator 160 is a set of uplink impulse responses which can be used to instruct an anechoic chamber for adding fading to a DUT signal detected by the uplink probes.

Application of the above-described method to several scenarios will now be described. In the following scenarios, TDD is assumed.

As indicated above, the target correlation $\rho_t$ between simulated uplink and downlink channels may be expressed by the following equation.

$$\rho_t = \sum_{n_u} c_{n_u} \cdot \sqrt{w_{n_u}} \cdot \sum_{i=1}^{I_{n_u}} \sqrt{g_{i+\sum_{m=1}^{n_u} I_{m-1}}}$$

If the PAS is uniform, i.e. $g_{n_d} = \frac{1}{N_d}$, $\rho_t$ reaches a value of $$\rho_t = \sum_{n_u} c_{n_u} \cdot \sqrt{w_{n_u}} \cdot \frac{I_{n_d}}{\sqrt{N_d}}$$

If $c_{n_u}$ reaches its maximum value, $$c_{n_u} = \frac{1}{\sqrt{I_{n_u}}}, \rho_t$$

reaches a value of $$\rho_t = \sum_{n_u} \sqrt{w_{n_u}} \cdot \frac{\sqrt{I_{n_u}}}{\sqrt{N_d}}$$

Finally, if $$w_{n_u} = \frac{I_{n_u}}{N_d},$$

we have $$\rho_t = \sum_{n_u} \sqrt{w_{n_u}} \cdot \frac{\sqrt{I_{n_u}}}{\sqrt{N_d}}$$

which, in the case of equal subsets, i.e. $I_{n_u} = \frac{N_d}{N_u} = I$, $\rho_t$ takes a value of 1:

From this it will be appreciated that the correlation of the simulated uplink and downlink channels reach 1 if:
the PAS is uniform, i.e. $g_{n_d} = \frac{1}{N_d}$ and $w_{n_u} = \frac{I_{n_u}}{N_d}$;

the subsets are equal, i.e. $I_{n_u} = \frac{N_d}{N_u} = I$;

and
the coefficient $c_{n_u}$ is set to its maximum value of $$\frac{1}{\sqrt{I_{n_u}}}.$$

Three specific scenarios A, B and C are now discussed:
Scenario A—uniform PAS, equal subsets, max $c_{n_u} \Rightarrow \rho_t = 1$
Scenario B—non-uniform PAS, equal subsets, max $c_{n_u} \Rightarrow \rho_t < 1$
Scenario C—non-uniform PAS, equal subsets, max $c_{n_u} \Rightarrow \rho_t < 1$
Details of these scenarios are set out in the following table.

| Scenario | Target channel model (i.e. PAS) | $N_d$ | $N_u$ | $I = \dfrac{N_d}{N_u}$ | $C_{n_u} = \dfrac{1}{\sqrt{I_{n_u}}}$ | Correlation $\rho_t$ |
|---|---|---|---|---|---|---|
| A | A uniform PAS | 16 | 4 | 4 | $\dfrac{1}{2}$ | 1 |
| B | A single Laplacian shaped spatial cluster with an AoA of 0° an angular spread of 35° | 16 | 8 | 2 | $\dfrac{\sqrt{2}}{2}$ | 0.97 |
| C | Laplacian shaped spatial cluster with an AoA of 0° an angular spread of 35° | 16 | 4 | 4 | $\dfrac{1}{2}$ | 0.89 |

Figure 11:
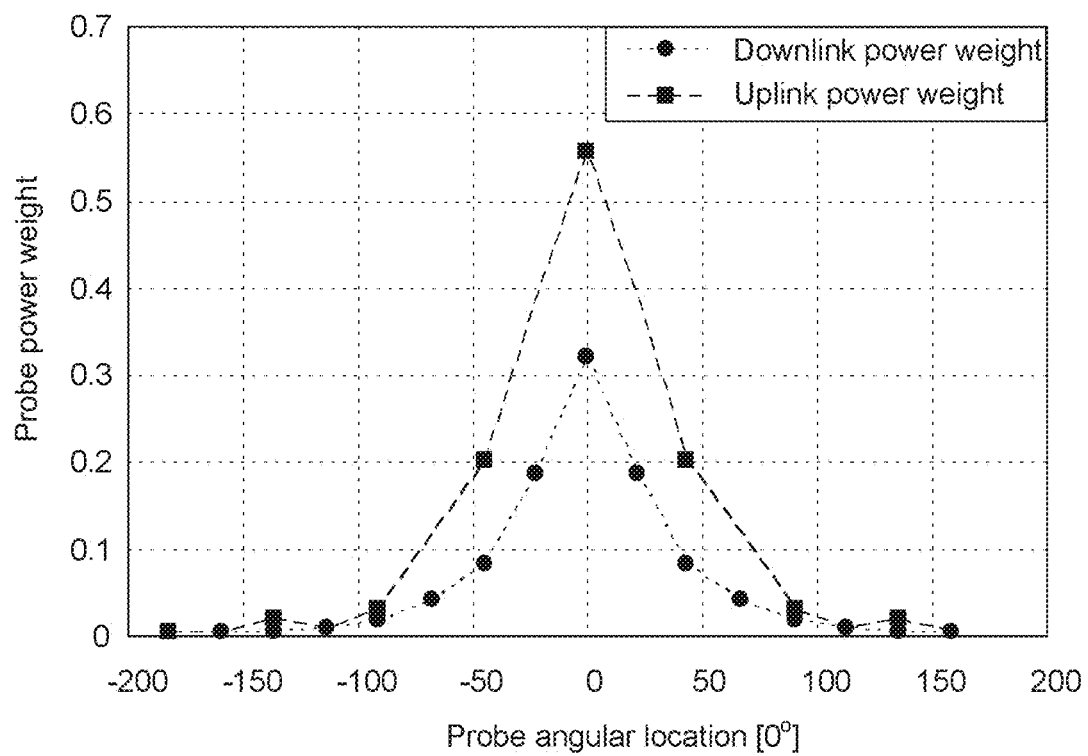
FIG. 11 is a graph illustrating the power weights of uplink and downlink probes of an anechoic chamber for simulating a radio channel according to an embodiment of the invention.

An example of the probe power weights for emulating a radio channel according to scenario B is shown in FIG. 11. Since there are fewer uplink probes than downlink probes, the uplink probes have larger power weightings than the downlink probes to emulate correlating uplink and downlink channels.

Figure 12:
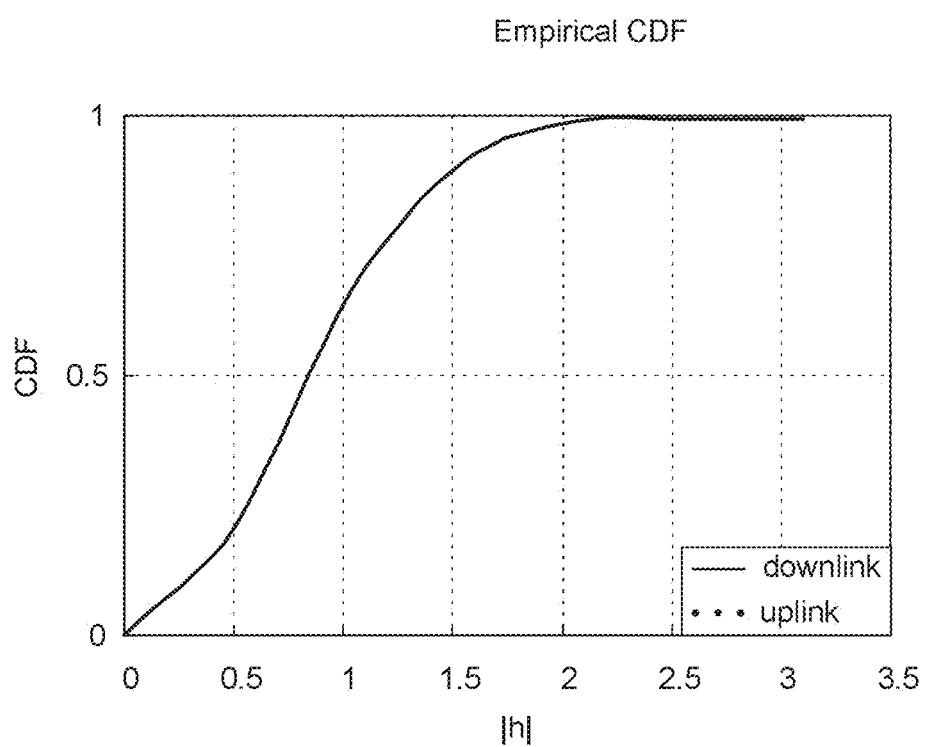
FIG. 12 is a graph illustrating the cumulative distribution function of uplink and downlink channels simulated according to an embodiment of the invention.
Figure 13:
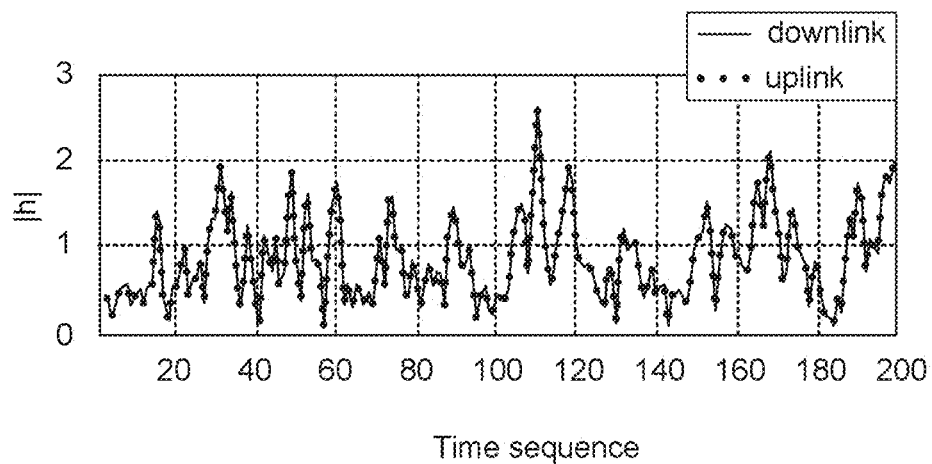
FIG. 13 is a graph illustrating the amplitudes of the simulated uplink and downlink channels of FIG. 12.

The cumulative distribution function (CDF) of the simulated uplink and downlink channels, $|h_u|$ and $|h_d|$, for scenario A is shown in FIG. 12, and the amplitudes of the same channels are shown in FIG. 13. It will be appreciated that the simulated uplink and downlink channels are identical for scenario A.

Figure 14:
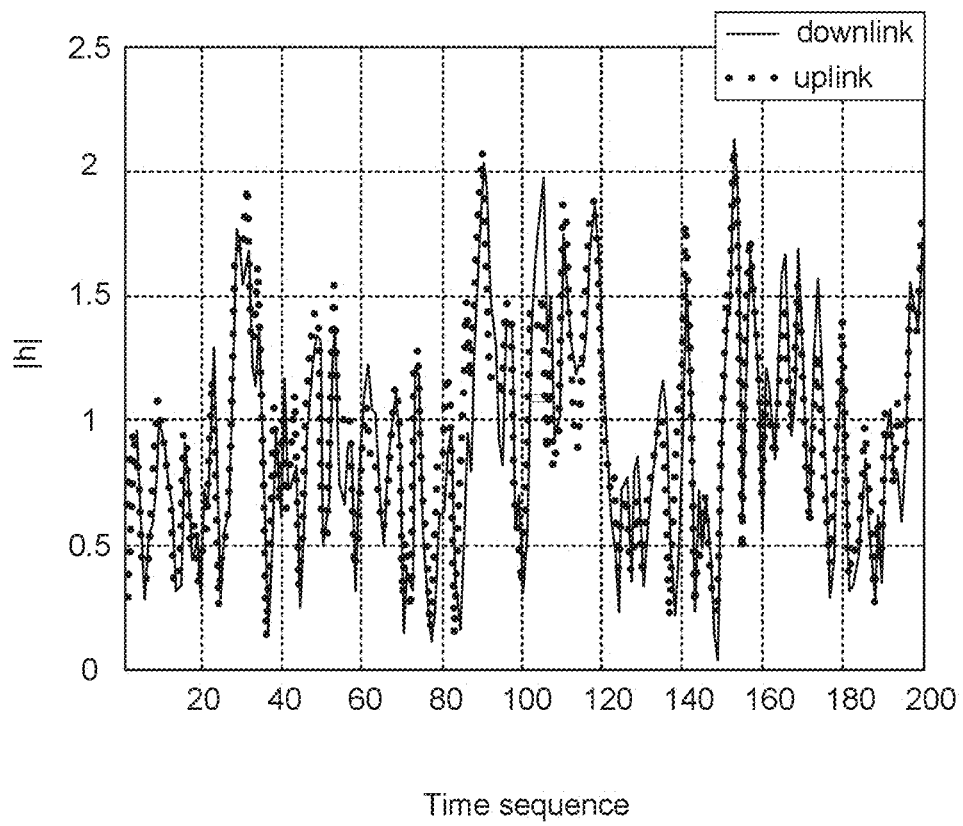
FIG. 14 is a graph illustrating the amplitudes of another pair of uplink and downlink channels simulated according to an embodiment of the invention.

FIG. 14 shows the amplitudes of the simulated uplink and downlink channels for scenario C. It can be seen that in this case, although the channels $|h_u|$ and $|h_d|$ are not identical they are highly correlated, achieving a correlation of $\rho=0.89$ for a non-uniform PAS with half as many uplink probes as downlink probes.

Some radiation patterns of the DUT reduce the correlation that can be achieved between uplink and downlink. If the radiation pattern of the DUT is known, the coefficients $\{c_{n_u}\}$ can be adjusted to compensate for this effect and correct the correlation. Even if the DUT radiation pattern reduces the achievable correlation and is not corrected for, the reduction in correlation is small, typically within 0.2%.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Although the present invention has been described in terms of specific exemplary embodiments, it will be appreciated that various modifications, alterations and/or combinations of features disclosed herein will be apparent to those skilled in the art without departing from the spirit and scope of the invention as set forth in the following claims.

The invention claimed is:

1. A system for emulating an over-the-air channel for communicating with a device under test, the system comprising:
    an anechoic chamber having $N_A$ primary probes and $N_B$ secondary probes where $N_A > N_B$;
    a dividing module for dividing $N_A$ primary impulse responses $\{\mu_{n_A}\}$ into $N_B$ subsets; and
    a defining module for defining $N_B$ secondary impulse responses $\{v_{n_B}\}$ in terms of the primary impulse responses $\{\mu_{n_A}\}$ and a set of $N_B$ complex sequences $\{\lambda_{n_B}\}$,
    wherein the primary probes are downlink probes, the primary impulse responses are downlink impulse responses, the secondary probes are uplink probes and the secondary impulse responses are uplink impulse responses, or the primary probes are uplink probes, the primary impulse responses are uplink impulse responses, the secondary probes are downlink probes and the secondary impulse responses are downlink impulse responses, and
    wherein the anechoic chamber is arranged to:
        emulate downlink transmission to the device under test by forming a beam with at least one of the downlink probes based on a primary channel model $h_A$ or a secondary channel model $h_B$, and
        emulate uplink transmission from the device under test by capturing a signal from the device under test with at least one of the uplink probes and artificially fading the signal based on the secondary channel model $h_B$ or the primary channel model $h_A$, respectively.

2. The system according to claim 1, wherein the defining module is arranged to define an $n_B$th secondary impulse response $v_{n_B}$ in terms of the primary impulse responses $\{\mu_{n_A}\}$ belonging to an $n_B$th subset and an $n_B$th complex sequence $\lambda_{n_B}$.

3. The system according to claim 1, further comprising a setting module for setting a correlation between the primary channel model $h_A = \Sigma_{n_A} \sqrt{g_{n_A}} \cdot \mu_{n_A}$ of the over-the-air channel and the secondary channel model $h_B = \Sigma_{n_B} \sqrt{w_{n_B}} \cdot v_{n_B}$ of the over-the-air channel to a predetermined value.

4. The system according to claim 3, wherein the defining module is arranged to define an $n_B$th secondary impulse response $v_{n_B}$ based on the correlation having been set to the predetermined value.

5. The system according to claim 4, wherein the setting module is arranged to determine, based on having set the correlation to the predetermined value, a coefficient $c_{n_B}$ for building the $n_B$th secondary impulse response $v_{n_B}$ from the primary impulse responses $\{\mu_{n_A}\}$ belonging to an $n_B$th subset and an $n_B$th complex sequence $\lambda_{n_B}$.

6. The system according to claim 5, wherein coefficients $\{c_{n_B}\}$, including the coefficient $c_{n_B}$, are in dependence on secondary weights $\{w_{n_B}\}$, primary weights $\{g_{n_A}\}$, and how the primary impulse responses are divided into $N_B$ subsets.

7. The system according to claim 3, wherein the communicating is by time-division duplexing and the predetermined value is one.

8. The system according to claim 3, wherein the communicating is by frequency-division duplexing and the predetermined value is between zero and one.

9. The system according to claim 1, wherein the $N_B$ complex sequences $\{\lambda_{n_B}\}$ are independent and identically distributed.

10. The system according to claim 1, wherein the subsets are of equal size.

11. The system according to claim 1, wherein the subsets are of unequal sizes.

12. The system according to claim 1, wherein the over-the-air channel has a uniform power angular spectrum.

13. The system according to claim 1, wherein the over-the-air channel comprises a Laplacian shaped spatial cluster.

14. A method of emulating an over-the-air channel for communicating with a device under test in an anechoic chamber having $N_A$ primary probes and $N_B$ secondary probes where $N_A > N_B$, the method comprising:
dividing $N_A$ primary impulse responses $\{\mu_{n_A}\}$ into $N_B$ subsets;
defining $N_B$ secondary impulse responses $\{v_{n_B}\}$ in terms of the primary impulse responses $\{\mu_{n_A}\}$ and a set of $N_B$ complex sequences $\{\mu_{n_A}\}$, wherein the primary probes are downlink probes, the primary impulse responses are downlink impulse responses, the secondary probes are uplink probes and the secondary impulse responses are uplink impulse responses, or the primary probes are uplink probes, the primary impulse responses are uplink impulse responses, the secondary probes are downlink probes and the secondary impulse responses are downlink impulse responses;

emulating downlink transmission to the device under test by forming a beam with at least one of the downlink probes based on a primary channel model $h_A$ or a secondary channel model $h_B$; and emulating uplink transmission from the device under test by capturing a signal from the device under test with at least one of the uplink probes and artificially fading the signal based on the secondary channel model $h_B$ or the primary channel model $h_A$, respectively.

15. The method according to claim 14, further comprising defining an $n_B$th secondary impulse response $v_{n_B}$ in terms of the primary responses $\{\mu_{n_A}\}$ belonging to an $n_B$th subset and an $n_B$th complex sequence $\lambda_{n_B}$.

16. The method according to claim 14, further comprising setting a correlation between the primary channel model $h_A = \Sigma_{n_A} \sqrt{g_{n_A}} \cdot \mu_{n_A}$ of the over-the-air channel and the secondary channel model $h_B = \Sigma_{n_B} \sqrt{w_{n_B}} \cdot v_{n_B}$ of the over-the-air channel to a predetermined value.

17. The method according to claim 16, further comprising defining an $n_B$th secondary impulse response $v_{n_B}$ based on the correlation having been set to the predetermined value.

18. The method according to claim 17, further comprising determining, based on having set the correlation to the predetermined value, a coefficient $c_{n_B}$ for building the $n_B$th secondary impulse response $v_{n_B}$ from the primary impulse responses $\{\mu_{n_A}\}$ belonging to an $n_B$th subset and an $n_B$th complex sequence $\lambda_{n_B}$.

* * * * *

UNITED STATES PATENT AND TRADEMARK OFFICE
CERTIFICATE OF CORRECTION

PATENT NO. : 10,128,967 B2  
APPLICATION NO. : 15/126795  
DATED : November 13, 2018  
INVENTOR(S) : Pekka Kyosti et al.

Page 1 of 1

It is certified that error appears in the above-identified patent and that said Letters Patent is hereby corrected as shown below:

In the Claims

In Column 19, Line 21, in Claim 14, delete "$\{\mu_{nA}\}$," and insert -- $\{\lambda_{nA}\}$, --, therefor.

Signed and Sealed this
Twenty-second Day of January, 2019

Andrei Iancu
*Director of the United States Patent and Trademark Office*